No. 735,329. PATENTED AUG. 4, 1903.
R. O. WILCOX.
VEHICLE WHEEL.
APPLICATION FILED FEB. 24, 1903.
NO MODEL.
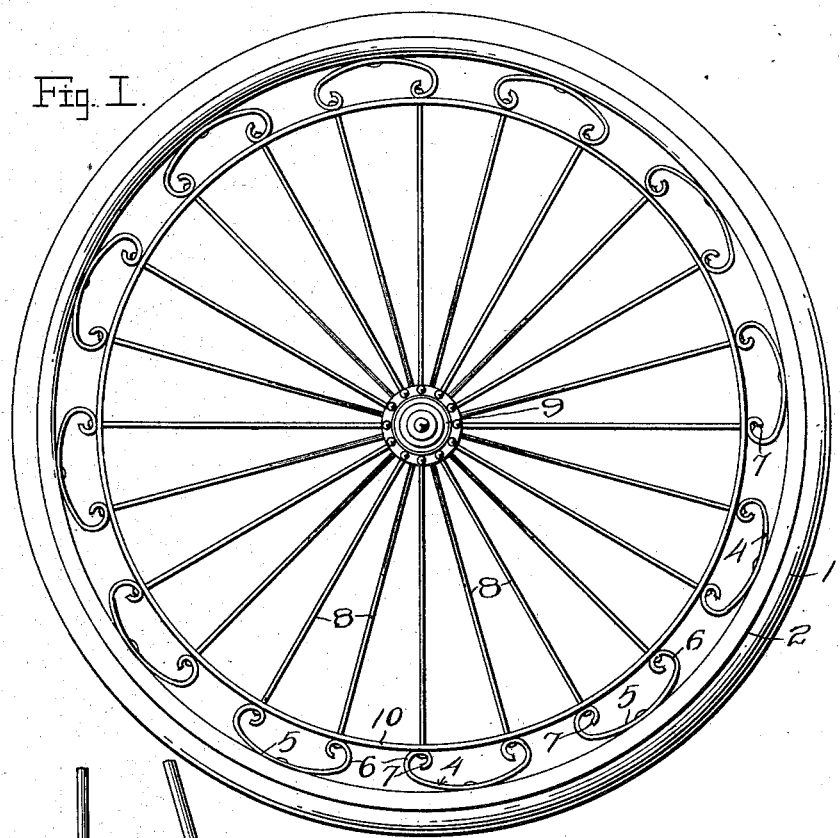
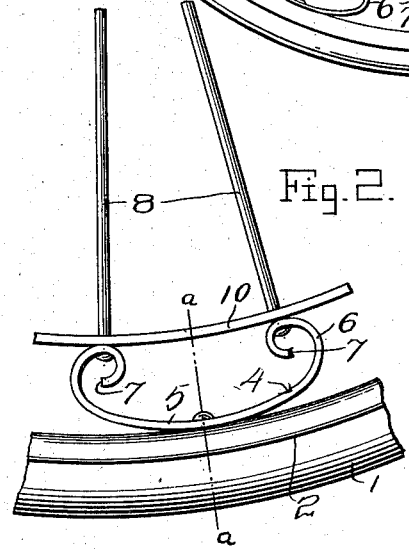
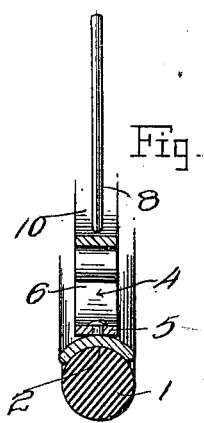
Inventor
Reuben O. Wilcox.
Witnesses
By H. B. Willson.
Attorney No. 735,329. Patented August 4, 1903.

UNITED STATES PATENT OFFICE.

REUBEN O. WILCOX, OF WICHITA, KANSAS.

VEHICLE-WHEEL.

SPECIFICATION forming part of Letters Patent No. 735,329, dated August 4, 1903.

Application filed February 24, 1903. Serial No. 144,809. (No model.)

*To all whom it may concern:*

Be it known that I, REUBEN O. WILCOX, a citizen of the United States, residing at Wichita, in the county of Sedgwick and State of Kansas, have invented certain new and useful Improvements in Bicycle and other Wheels; and I do declare the following to be a full, clear, and exact description of the invention, such as will enable others skilled in the art to which it appertains to make and use the same.

My invention relates to improvements in wheels for bicycles and other vehicles; and it consists in the peculiar construction and combination of devices hereinafter described and claimed.

The object of my invention is to effect improvements in the construction of bicycle or other vehicle wheels such as will enable the inflated tires now commonly employed to be dispensed with and such as will greatly strengthen the construction of the wheel and add materially to the resiliency thereof, hence enabling bicycles and other vehicles provided with wheels embodying my improvements to be propelled with less power than is now necessary and to ride more easily than heretofore.

In the accompanying drawings, Figure 1 is a side elevation of a bicycle-wheel embodying my improvements. Fig. 2 is a detail elevation of the same on a larger scale, and Fig. 3 is a detail transverse sectional view taken on the plane indicated by the line $a\ a$ of Fig. 2.

In the embodiment of my invention here shown I provide a tire 1, which is preferably solid and made of hard rubber. This tire is placed in the channel 2 on the outer side of a felly. Preferably the felly is made of steel or other suitable metal; but I do not limit myself in this particular. On the inner side of the felly are secured a plurality of springs 4, each of which comprises a segmental intermediate portion 5, which bears against the felly and is secured thereto, and spring-arms 6 at the ends of said intermediate portion. The said spring-arms extend inwardly—that is to say, toward the center of the wheel—and the same are bent in volute form, as shown in detail in Fig. 2. The ends 7 of the volute arms 6 are normally spaced somewhat from the intermediate portions of the springs and are free to move toward and from the same. The spokes or spoke-rods 8 of the wheel which radiate from the hub 9 are secured to the volute arms 6 of the springs at the intermediate portions of said volute arms, as shown.

It will be understood that my improved springs add greatly to the resiliency of the wheel and cause the bicycle or other vehicle to run very easily. The tire 1 being preferably of hard rubber and solid does not flatten where it contacts with the earth, hence greatly reducing the friction, and is not liable to puncture and to be otherwise disarranged. Ordinarily the ends 7 of the volute arms of the springs are out of contact with the intermediate portions 5 of the springs; but when the wheel is heavily loaded the ends 7 of the volute arms come in contact with the intermediate portion of the springs, and hence the load is distributed to both sides of the volute arms of the springs, as will be understood, and thus the strength of the springs is increased proportionately with the stress to which they are subjected.

A hoop 9 is disposed within the spring in contact with the volute inturned arms thereof, and the spokes extend through openings in this inner hoop or ring. The function of the same, as will be understood, is to distribute the stress evenly to all of the springs and to keep the spokes from bending under the stress, and thereby prevent the wheel from wabbling.

From the foregoing description, taken in connection with the accompanying drawings, the construction, operation, and advantages of my invention will be readily apparent, it is thought, without requiring a more extended explanation.

Various changes in the form, proportion, and the minor details of construction may be resorted to without departing from the principle or sacrificing any of the advantages of my invention.

Having thus fully described my invention, what I claim as new, and desire to secure by Letters Patent, is—

1. A wheel having springs on the inner side of its rim provided with volute arms, the ends of which are normally spaced from the intermediate portions of the springs and are free to move toward and from the same, and spokes attached to the intermediate portion of said volute spring-arms, substantially as described.

2. A wheel of the class described having a resilient tire, a felly and springs on the inner side of the felly having inturned volute arms to which the spokes are attached, substantially as described.

3. A wheel having springs on the inner side of its rim provided with volute arms, the ends of which are normally spaced from the intermediate portions of the springs and are free to move toward and from the same, spokes attached to the intermediate portions of said volute spring-arms, and an inner ring bearing on the said springs, and having openings through which the spokes extend, for the purpose set forth, substantially as described.

4. A wheel having springs in its rim provided with volute arms, spokes attached to the said volute arms of the springs, and an inner ring within and bearing against the volute arms of the springs, said inner ring having openings through which the spokes extend, substantially as described.

In testimony whereof I have hereunto set my hand in presence of two subscribing witnesses.

REUBEN O. WILCOX.

Witnesses:
JOHN A. DUNCAN,
A. H. MCKEE.